United States Patent
Huang et al.

(10) Patent No.: US 12,204,135 B2
(45) Date of Patent: Jan. 21, 2025

(54) BACKLIT MODULE AND ILLUMINATED KEYSWITCH STRUCTURE

(71) Applicant: Darfon Electronics Corp., Taoyuan (TW)

(72) Inventors: Heng-Yi Huang, Taoyuan (TW); Hsin-Cheng Ho, Taoyuan (TW); Po-Yueh Chou, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/592,794

(22) Filed: Mar. 1, 2024

(65) Prior Publication Data
US 2024/0201430 A1  Jun. 20, 2024

Related U.S. Application Data

(63) Continuation of application No. 18/192,848, filed on Mar. 30, 2023, now Pat. No. 11,947,150.
(Continued)

(30) Foreign Application Priority Data

Mar. 9, 2023  (TW) .................................. 112108773

(51) Int. Cl.
*F21V 8/00*  (2006.01)
*H01H 13/705*  (2006.01)
*H01H 13/83*  (2006.01)

(52) U.S. Cl.
CPC ......... *G02B 6/0035* (2013.01); *G02B 6/0055* (2013.01); *H01H 13/705* (2013.01);
(Continued)

(58) Field of Classification Search
CPC .... G02B 6/0035; G02B 6/0055; G02B 6/006; G02B 6/0011; G02B 6/0018; G02B 6/0031; H01H 13/705; H01H 13/83; H01H 2219/062; H01H 2219/06; H01H 2219/044; F21V 2200/00; F21V 2200/20; F21V 13/00
See application file for complete search history.

(56) References Cited

U.S. PATENT DOCUMENTS 10,147,569 B1 * 12/2018 Huang ................. G02B 6/0031
11,947,150 B2 *  4/2024 Huang ................... H01H 3/125
(Continued)

*Primary Examiner* — Bao Q Truong
(74) *Attorney, Agent, or Firm* — McClure, Qualey & Rodack, LLP

(57) ABSTRACT

A backlit-module-embedded illuminated keyswitch structure includes a baseplate, a mask film disposed below the baseplate and having a first coating configured to substantially reflect a light, a light guide sheet disposed at one side of the mask film and having a light source hole, a reflective layer disposed at one side of the light guide sheet opposite to the mask film and having an opening communicating with the light source hole, a top glue configured to connect the mask film and the light guide sheet around the light source hole, and a bottom glue configured to connect the light guide sheet and the reflective layer around the light source hole. The first coating covers the light source hole. In a stacked direction of the mask film, the light guide sheet, and the reflective layer, at least one of the top glue and the bottom glue overlaps the first coating.

20 Claims, 12 Drawing Sheets

Related U.S. Application Data

(60) Provisional application No. 63/325,623, filed on Mar. 31, 2022, provisional application No. 63/368,272, filed on Jul. 13, 2022.

(52) U.S. Cl.
CPC ............. *H01H 13/83* (2013.01); *G02B 6/006* (2013.01); *H01H 2219/062* (2013.01)

(56) References Cited

U.S. PATENT DOCUMENTS

| | | | | |
|---|---|---|---|---|
| 2010/0097246 A1* | 4/2010 | Watanabe | ............. | H01H 13/83 341/22 |
| 2011/0168538 A1* | 7/2011 | Hwa | ..................... | H01H 13/83 200/5 A |
| 2015/0332874 A1* | 11/2015 | Brock | ................... | H01H 11/00 29/622 |
| 2022/0216018 A1* | 7/2022 | Huang | ................... | H01H 13/83 |
| 2022/0336167 A1* | 10/2022 | Huang | ................... | H01H 13/83 |
| 2022/0351921 A1* | 11/2022 | Huang | ................... | H01H 3/125 |

\* cited by examiner

BACKLIT MODULE AND ILLUMINATED KEYSWITCH STRUCTURE

CROSS REFERENCE TO RELATED APPLICATIONS

This application is a continuation application of U.S. application Ser. No. 18/192,484, filed on Mar. 30, 2023, which claimed the priority benefit of U.S. application Ser. No. 63/325,623, filed on Mar. 31, 2022 and U.S. application Ser. No. 63/368,272, filed on Jul. 13, 2022, and also claimed the priority benefit of Taiwan patent application No. 112108773, filed on Mar. 9, 2023. The entirety of the above-mentioned patent application is hereby incorporated by reference herein and made a part of this specification.

BACKGROUND OF THE INVENTION

1. Field of the Invention

The invention generally relates to a keyswitch structure. Particularly, the invention relates to an illuminated keyswitch structure and a backlit module thereof.

2. Description of the Prior Art

Currently, in order to increase the brightness of the illuminated keyswitch, a single keyswitch has been equipped with a dedicated light source under the baseplate to emit light upward. However, such structures usually have the problem of uneven lighting; for example, the character at the center of the keycap is too bright, while the characters at the corners are too dark.

In addition, the keycap outline halo is also one of the functions of the backlit structure to provide the recognition of keycap boundary. However, the above-mentioned configuration will make the keycap outline halo uneven or too dark, so the keycap characters and keycap boundaries on the keyboard are not easy to recognize, and it is difficult to achieve the consistent luminance uniformity.

Moreover, for the heat dissipation or positioning purpose, the keyswitch usually has a heat dissipation hole or a structural hole, which penetrates through the baseplate and the underlying films or sheets thereof. However, where the heat dissipation or structural hole is formed will be the location where the light leakage occurs, so a light-shielding design is also required.

SUMMARY OF THE INVENTION

It is an object of the invention to provide an illuminated keyswitch structure and a backlit module thereof, which have a designed glue distribution to effectively guide the light along the transverse (horizontal) direction and then output the light, so as to improve the problem of the center character of the keycap being too bright, and further improve the luminance uniformity.

It is another object of the invention to provide an illuminated keyswitch structure and a backlit module thereof, which incorporate the designed glue distribution with the optical film set to recycle most of light during the transverse propagation to prevent the light leakage, so as to improve the luminance uniformity and the brightness.

In an embodiment, the invention provides a backlight module including a mask film having a first coating configured to substantially reflect a light, a light guide sheet disposed at one side of the mask film, the light guide sheet having a light source hole, a reflective layer disposed at one side of the light guide sheet opposite to the mask film, the reflective layer having an opening communicating with the light source hole, a top glue configured to connect the mask film and the light guide sheet and located around the light source hole, and a bottom glue configured to connect the light guide sheet and the reflective layer and located around the light source hole, wherein the first coating covers the light source hole, and in a stacked direction of the mask film, the light guide sheet, and the reflective layer, at least one of the top glue and the bottom glue overlaps the first coating.

In an embodiment, the backlit module of the invention is configured to project light to a central hole of a baseplate above the backlit module, wherein the mask film further includes a second coating configured to substantially block the light. The second coating is closer to the baseplate than the first coating is. A vertical projection of the second coating on the baseplate is located within the central hole.

In an embodiment, a vertical projection of the top glue or the bottom glue on the mask film is located within the first coating.

In an embodiment, the top glue or the bottom glue is disposed surrounding the light source hole, and a diameter of a portion of the first coating covering on the light source hole is larger than a diameter of the top glue.

In an embodiment, the top glue is spaced apart from an edge of the light source hole of the light guide sheet to form a top clearance region therebetween, and the bottom glue is spaced apart from the edge of the light source hole of the light guide sheet to form a bottom clearance region therebetween.

In an embodiment, the bottom clearance region is larger than the top clearance region.

In an embodiment, the light guide sheet has a plurality of light-exit portions. The top clearance region and the bottom clearance region are provided without the light-exit portions.

In another embodiment, the invention provides an illuminated keyswitch structure including a baseplate having an inner rib configured to define a central hole, a mask film disposed below the baseplate, a light guide sheet disposed on one side of the mask film opposite to the baseplate, the light guide sheet having a light source hole, a reflective layer disposed on one side of the light guide sheet opposite to the mask film, the reflective layer having an opening communicating with the light source hole, a top glue disposed on a top surface of the light guide sheet and located around the light source hole, and a bottom glue disposed on a bottom surface of the light guide sheet and located around the light source hole, wherein in a stacked direction of the baseplate, the mask film, the light guide sheet, and the reflective layer, at least one of the top glue and the bottom glue overlaps the inner rib.

In an embodiment, the mask film has a first coating configured to substantially reflect a light and a second coating configured to substantially block the light. The second coating is closer to the baseplate than the first coating is. A vertical projection of the first coating on the baseplate overlaps the central hole of the baseplate and extends to the inner rib. A vertical projection of the second costing is located within the central hole.

In an embodiment, the baseplate further has at least one bridge rib configured to define at least one peripheral hole. The vertical projection of the first coating on the baseplate further overlaps the at least one bridge portion.

In an embodiment, the light guide sheet has a plurality of light-exit portions disposed corresponding to the at least one peripheral hole.

In an embodiment, at least one of the top glue and the bottom glue overlaps the inner rib and the first coating in the stacked direction.

In an embodiment, the light guide sheet has a plurality of light-exit portions. A vertical projection of the plurality of light-exit portions on the baseplate does not overlap the inner rib.

In yet another embodiment, the invention provides a backlit module including a mask film having a first coating configured to substantially reflect a light, a driving circuit board disposed below the mask film, a light guide sheet disposed between the mask film and the driving circuit board, the light guide sheet having a light source hole and a plurality of light-exit portions, a light-emitting element fixed on the driving circuit board by an adhesive layer and located in the light source hole, a top glue disposed on a top surface of the light guide sheet and located around the light source hole, and a bottom glue disposed on a bottom surface of the light guide sheet and located around the light source hole, wherein in a stacked direction of the mask film, the light guide sheet, and the driving circuit board, at least one of the top glue and the bottom glue does not overlap the adhesive layer.

In an embodiment, the backlit module of the invention further includes a through hole penetrating through the mask film, the light guide sheet, and the driving circuit board. The mask film has a second coating configured to substantially block the light. The first coating is closer to the light guide sheet than the second coating is. The first coating and the second coating are disposed around the through hole. The first coating is retreated from the through hole with respect to the second coating to form a modulation region.

In an embodiment, the backlit module of the invention further includes a through hole, a reflective layer disposed between the driving circuit board and the light guide sheet, and at least one of a through-hole top glue and a through-hole bottom glue. The through hole penetrates through the mask film, the light guide sheet, the reflective layer, and the driving circuit board. The through-hole top glue is disposed over the light guide sheet, and the through-hole bottom glue is disposed under the light guide sheet.

In an embodiment, at least one of the through-hole top glue and the through-hole bottom glue overlaps the first coating in the stacked direction.

In an embodiment, the through-hole top glue or the through-hole bottom glue is spaced apart from an edge of the through hole at the light guide sheet to form a top clearance region or a bottom clearance region therebetween.

In an embodiment, the adhesive layer is light permeable, and a portion of the reflective layer is located in the light source hole, so a reflected light enters the light guide sheet from a sidewall of the light source hole via the adhesive layer and/or the reflective layer to travel along a transverse direction.

In an embodiment, the backlit module of the invention further includes a fourth coating disposed on the driving circuit board surrounding the through hole and configured to substantially block the light.

In an embodiment, the plurality of light-exit portions of the light guide sheet is located between the light source hole and the through hole, and the plurality of light-exit portions of the light guide sheet is located between the bottom glue and the through-hole bottom glue.

In an embodiment, the backlit module of the invention further includes a plurality of light-exit portions and a side glue, wherein the side glue is disposed along a side of a keycap. A vertical projection of the plurality of light-exit portions is located between the top glue and the side glue or located between the bottom glue or the side glue.

Compared with the prior art, the illuminated keyswitch structure and the backlit module of the invention have a designed glue distribution and a designed coating pattern, which can effectively guide the light along the transverse direction and then output the light, and can recycle most of light during the transverse propagation to prevent the light leakage, so as to improve the luminance uniformity and the brightness. Moreover, the illuminated keyswitch structure and the backlit module of the invention can effectively prevent the light leakage of the heat dissipation hole or structure hole with the designed glue distribution and the designed coating pattern.

DETAILED DESCRIPTION OF THE PREFERRED EMBODIMENT

Figure 1A:
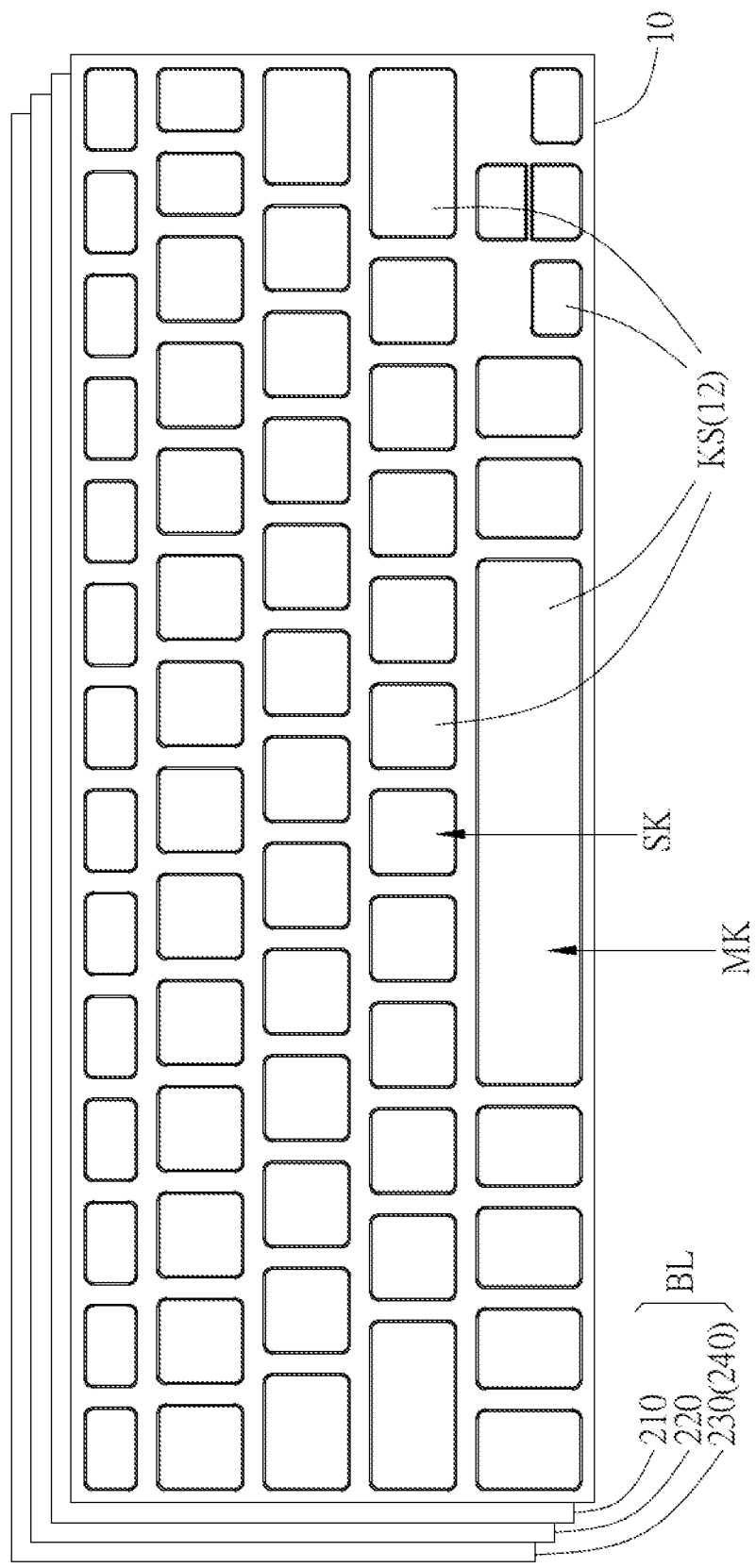
FIG. 1A is a schematic view of the stack of the illuminated keyboard in an embodiment of the invention.

The invention mainly involves the complex application of the adhesion function and the optical properties of adhesives (e.g. light-permeable glue layer) in a sophisticated optical system (e.g. an illuminated keyboard and an illuminated keyswitch with a backlit module). The invention is designed to modulate the glue layer and the associated optical elements to achieve the ultimate luminous effect for a single keyswitch or even the entire keyboard and to promote the luminance uniformity. Therefore, it is necessary to understand the invention concept in the embodiments of the invention, and how to optimize the backlit module, the illuminated keyswitch structure, and the illuminated keyboard of the invention in consideration of multiple variables and restriction will be described in detail.

In pursuit of extremely thin electronic devices, such as laptop computer and keyboard, the illuminated keyswitch and the backlit module thereof are intensively integrated in a small space. With the miniaturization of light sources, reduction of luminous efficacy, modification of optical materials year by year, a slight change of different optical elements will cause a significant change in the luminous effect. Therefore, the backlit design for keyswitch must consider complex technical issues, which cannot be solved by simple design choices.

At first, light sources of different light input positions, different sizes, or different numbers/locations of light-emitting surfaces have height differences when cooperating with the light guide sheet, which may easily cause the optical film to float and cause light leakage. Moreover, when the relative position between the light source and the optical film (mask film, light guide sheet, reflective layer, and light source circuit board) is not fixed, the optical coupling will also be unstable. However, simply fixing the relative position between the light source and the optical film by glue will fall into a technical trap that seriously affects the optical effect. For example, if the refractive index of the light-permeable glue layer is closer to that of the light guide sheet than the air, the glue layer will more easily destroy the total reflection of the light guide sheet. Consequently, light will be easily emitted out of the light guide sheet from where the glue layer is disposed. For example, when a dedicated light source is provided to the keyswitch with the keycap having an area of 1 square centimeter, the ultra-thin key height of 2 mm, and the 1.8 mm backlit module, providing the glue layer on the light guide sheet around the light source with the mask film and the reflective layer/light source (driving) circuit board for reflecting light inwards will cause a large amount of light that just comes out of the light source to directly or indirectly pass through the glue layer. As such, the light is repeatedly in and out of the light guide sheet at the periphery inside and outside the light source hole of the light guide sheet and between the mask film and the reflective layer/light source circuit board, resulting in unnecessary loss of light, reduction of light flux transmitted toward the transverse (horizontal) direction. This will have a huge impact on the backlit applications with the light source of low illuminance because the keycap halo and the corner characters will become very dim. If the glue layer is only arranged on the outline of the keycap and not around the light source, the tolerance of thickness, hole position, glue printing for each optical film before and after the rolling, punching, and heating processes will cause problems, such as light source shift, extrusion, or falling off. In addition, the distance between the glue and the light source, the distance between the glue and the light source hole of the light guide sheet, the distance between the light source and the light source hole, the relative position between the glue and the mask/reflective optical element will also cause differences in the optical effect.

On the other hand, whether the glue is applied to the heat dissipation hole or the structure hole (closed hole or open hole) or not, the application location of glue, and the cooperation with optical element the (absorption/reflection/total reflection/diffusion/refraction, etc.) will have different modifications and effects from the glue applied to the neighborhood of the light source. For example, the mask film and the reflective layer/light source circuit board of the backlit module are adhered in the heat dissipation hole or the structural hole, i.e., the glue is applied outside the edge of the light guide sheet, it may cause serious light leakage due to the optical coupling effect of the glue. If the edges are not adhered by the glue, allowing the light to be directly emitted from the hole wall of the light guide sheet will cause serious light leakage. In other words, the relative position between the glue and the optical element must be optimized to reduce the light leakage from the heat dissipation hole or structure hole.

Referring to FIG. 1A, FIG. 1A is a schematic view of the stack of the illuminated keyboard in an embodiment of the invention. In an embodiment, the illuminated keyboard KB of the invention includes a plurality of keyswitches KS (such as square keyswitches SK or multiple keyswitches MK) and a backlit module BL. Each keyswitch KS includes a keycap 12, an up-down lift structure 14, a portion of a membrane circuit board 16, a restoring member 18, and a portion of a baseplate 10. For the illuminated keyboard KB, the backlit module BL includes a mask film 210, a light guide sheet 220 and a driving circuit board 240, and the driving circuit board 240 can include a reflective layer 230 and a light-emitting element 250 disposed thereon.

Figure 1B:
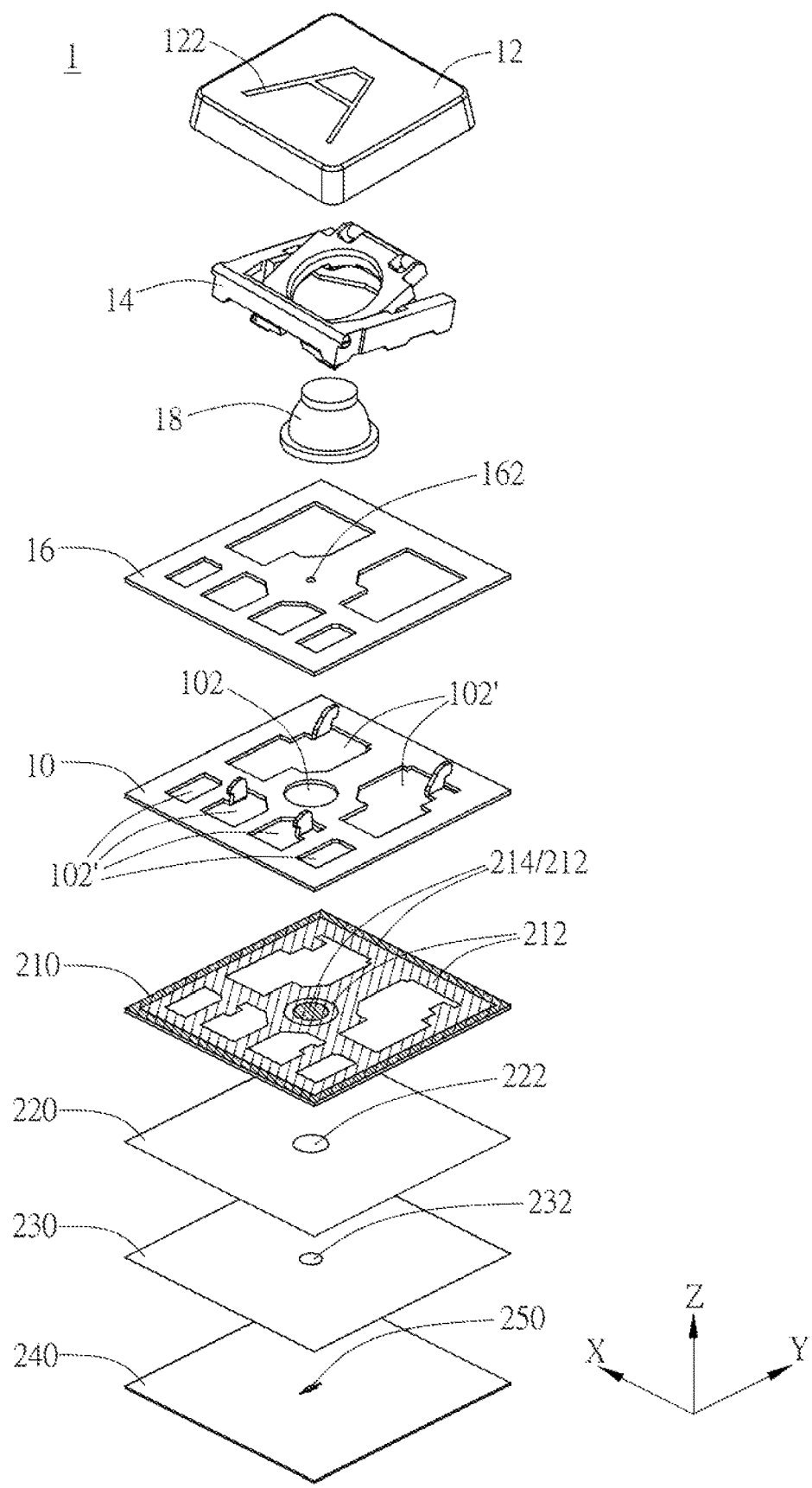
FIG. 1B is a schematic exploded view of the illuminated keyswitch structure in an embodiment of the invention.
Figure 2:
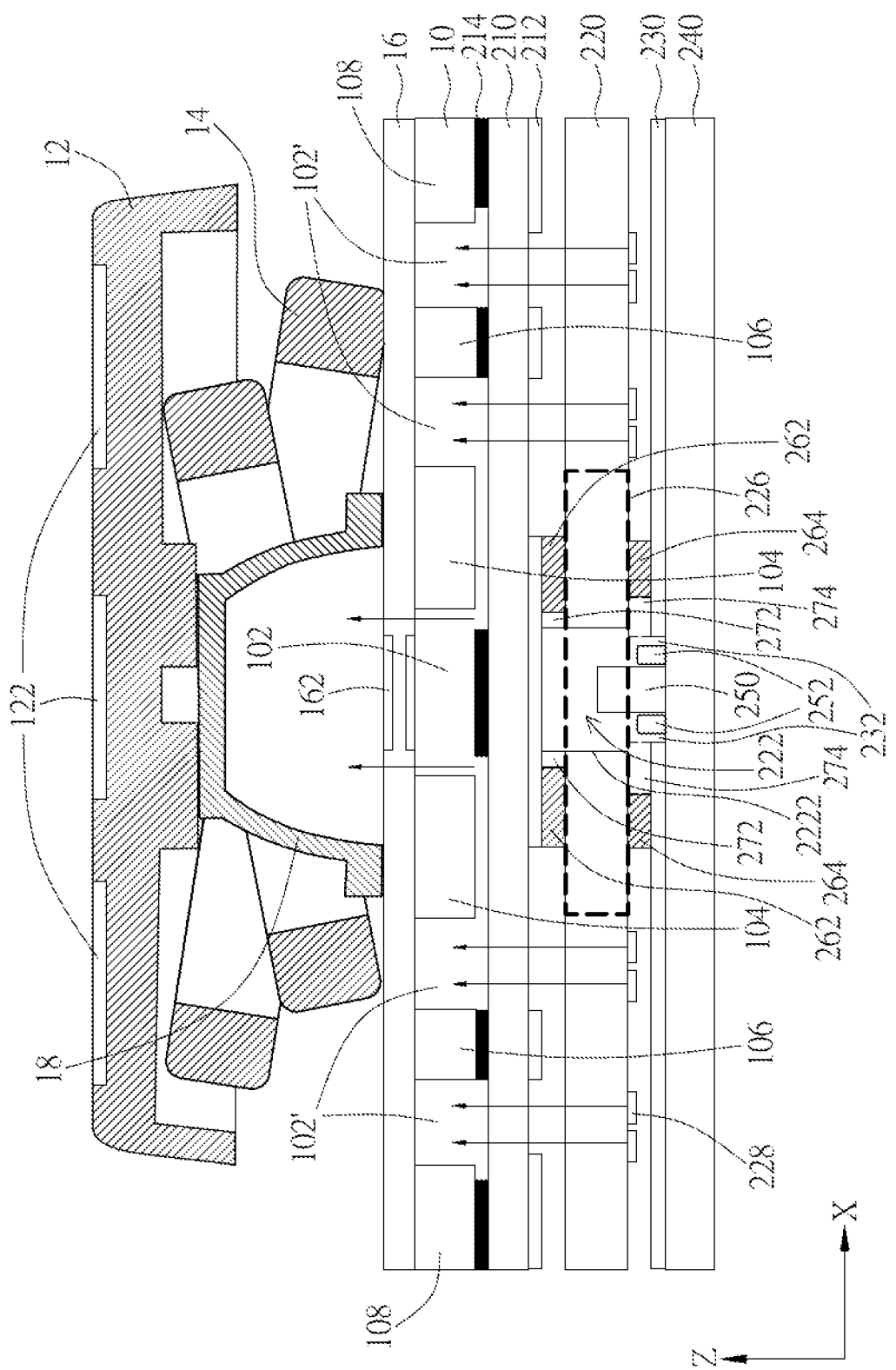
FIG. 2 is a schematic cross-sectional view of the illuminated keyswitch structure in an embodiment of the invention.

Referring to FIG. 1B and FIG. 2, FIG. 1B is a schematic exploded view of the illuminated keyswitch structure in an embodiment of the invention, and FIG. 2 is a schematic cross-sectional view of the illuminated keyswitch structure in an embodiment of the invention. For a single keyswitch structure, in an embodiment, the illuminated keyswitch structure 1 of the invention includes the baseplate 10, the keycap 12, the up-down lift structure 14, the membrane circuit board 16, the restoring member 18, the mask film 210, the light guide sheet 220, the reflective layer 230, the driving circuit board 240, and the light-emitting element 250. The keycap 12 is disposed over the baseplate 10 and has a light permeable portion 122 (e.g. one or more light permeable characters). The up-down lift structure 14 is connected between the baseplate 10 and the keycap 12 and configured to support the up-down movement of the keycap 12 relative to the baseplate 10. The membrane circuit board 16 is disposed under the keycap 12 and preferably above the baseplate 10. The membrane circuit board 16 has a switch 162 (represented by a circle in FIG. 1B). The membrane circuit board 16 has a multi-layered structure, and the switch circuit is formed on one or more layers thereof. When the keycap 12 is pressed, the switch 162 of the membrane circuit board 16 will be conducted. The restoring member 18 is disposed between the keycap 12 and the baseplate 10 and configured to provide a restoring force to enable the keycap 12 to move upward relative to the baseplate 10 to the non-pressed position when the pressing force is released. In this embodiment, the restoring member 18 can be embodied as an elastic member (e.g. rubber dome) and disposed corresponding to the switch 162. When the keycap 12 is pressed and moves downward to compress the restoring member 18, the restoring member 18 can trigger the switch 162, but not limited thereto, The switch 162 can be triggered by a triggering portion, which can be disposed on the restoring member 18, the up-down lift structure 14, or the keycap 12, but not limited thereto. According to practical applications, the restoring member 18 can be embodied as any suitable element, which can provide the restoring force to enable the keycap 12 to return the non-pressed position, such as spring, magnetic member. The switch of the illuminated keyswitch structure 1 is not limited to the switch 162 of the membrane circuit board 16 and can be any suitable switch, which is triggered in response to the pressing of the keycap 12, such as mechanical switch, magnetic switch, optical switch. In this embodiment, the up-down lift structure 14 can be embodied as a scissors-like up-down lift structure, which has two frames pivotally coupled with each other, and two ends of each frame are movably coupled to the baseplate 10 and the keycap 12, respectively, but not limited thereto. According to practical applications, the up-down lift structure 14 can be embodied as a butterfly up-down lift structure, a cantilever up-down lift structure, etc. The baseplate 10, the keycap 12, the up-down lift structure 14, the membrane circuit board 16, and the restoring member 18 constitute the keyswitch unit of the illuminated keyswitch structure 1.

As shown in FIG. 2, the mask film 210 is disposed below the baseplate 10, and the mask film 210 preferably has a first coating 212 and a second coating 214. The first coating 212 is configured to substantially reflect light, such as the light emitted from the light-emitting element 250), and the second coating 214 is configured to substantially block light. The light guide sheet 220 is disposed at one side of the mask film 210 opposite to the baseplate 10 (e.g. the lower side), and the light guide sheet 220 has a light source hole 222 corresponding to the central hole 102 of the baseplate 10. The reflective layer 230 is disposed at one side of the light guide sheet 220 opposite to the mask film 210 (e.g. the lower side), and the reflective layer 230 has an opening 232, which communicates with the light source hole 222. The light-emitting element 250 is fixed on the driving circuit board 240 by an adhesive layer 252 and is electrically coupled to the light source circuit of the driving circuit board 240. The adhesive layer 252 can be a non-conductive adhesive layer, which is configured to fix the light-emitting element 250 on the driving circuit board 240, instead of the solder paste or other conductive layer, which is configured to fix and electrically connect the light-emitting element 250 to the driving circuit board 240. The driving circuit board 240 is disposed below the light guide sheet 220, so the light-emitting element 250 can extend upward into the light source hole 222 of the light guide sheet 220 from below the opening 232 of the reflective layer 230. In an embodiment, the light-emitting element 250 can be a micro light-emitting diode (LED), which can have a light-emitting pattern from five surfaces, mainly top-lighting, such as 80% of light emitting from the top surface, and the rest of light from four side surfaces, but not limited thereto. The mask film 210, the light guide sheet 220, the reflective layer 230, the driving circuit board 240, and the light-emitting element 250 constitute the backlit unit (or module) of the illuminated keyswitch structure 1. Moreover, the adhesive layer 252 can be light permeable, and a portion of the reflective layer 230, which surrounds the light-emitting element 250, can be disposed in the light source hole 222, so the reflected light can enter the light guide sheet 220 from the sidewall of the light source hole 222 via the adhesive layer 252 and/or the reflective layer 230 disposed in the light source hole 222, and then travels along the transverse (or horizontal) direction.

Figure 3:
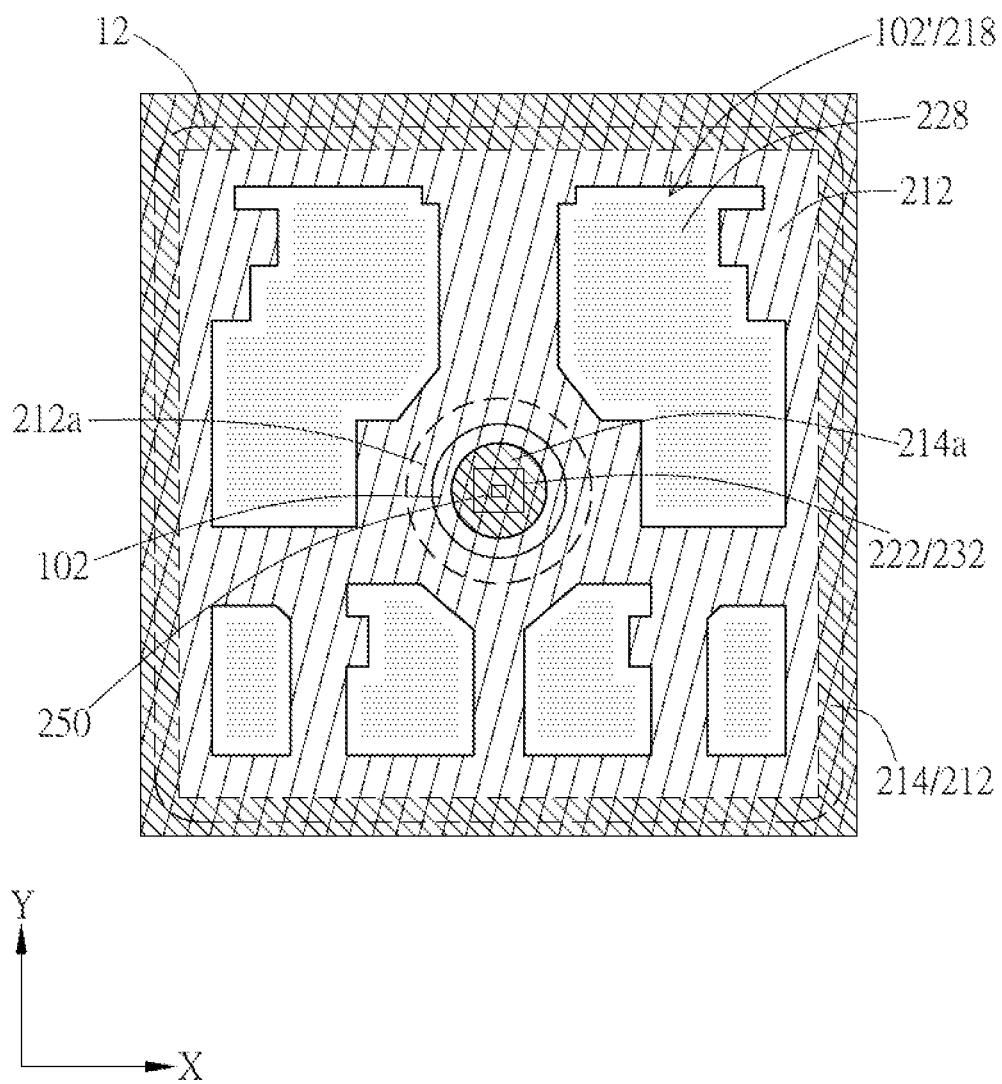
FIG. 3 is a schematic plan view of the stack of certain components of the illuminated keyswitch structure in an embodiment of the invention.
Figure 3A:
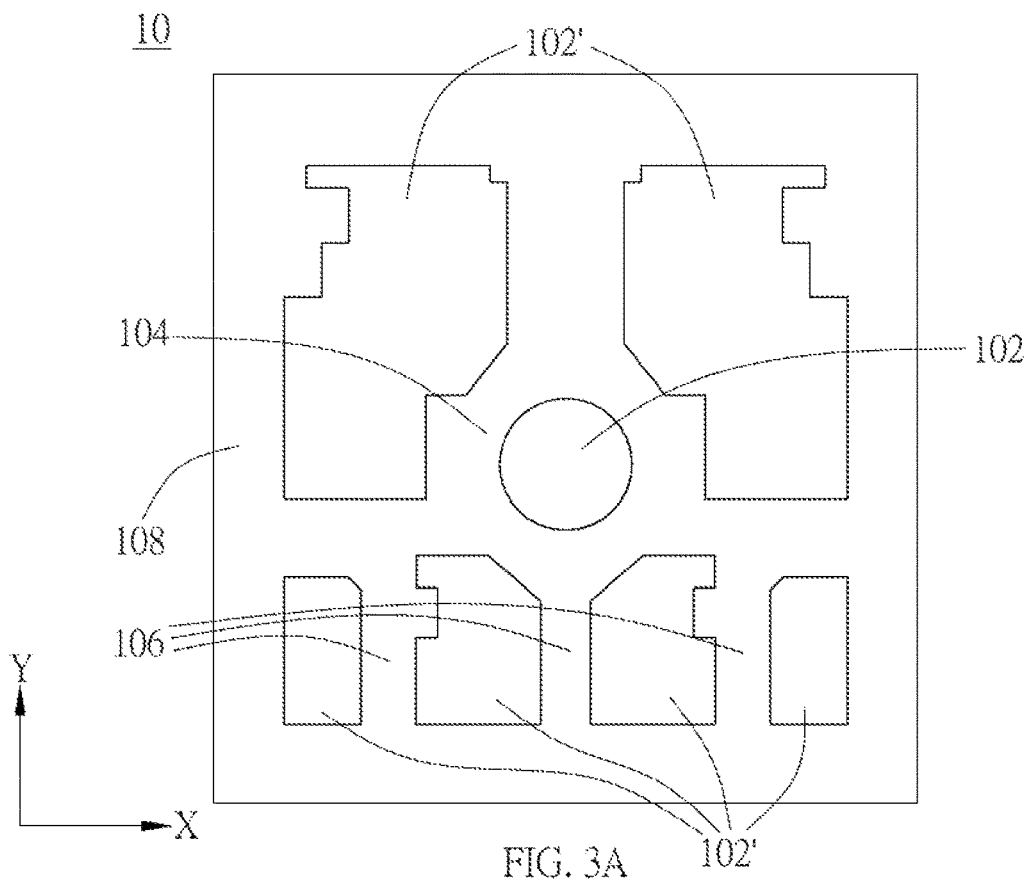
FIG. 3A to FIG. 3D are schematic plan views of the components of FIG. 3, respectively.

Referring to FIG. 3 and FIG. 3A to FIG. 3D, FIG. 3 is a schematic plan view of the stack of certain components (e.g. the baseplate 10, the mask film 210, the light guide sheet 220, the driving circuit board 240 including the reflective layer 230) of the illuminated keyswitch structure in an embodiment of the invention, and FIG. 3A to FIG. 3D are schematic plan views of the components of FIG. 3, respectively. As shown in FIG. 3 and FIG. 3A, the baseplate 10 can be formed by metal stamping, so the baseplate 10 has a plurality of ribs connected to each other (such as inner rib 104, bridge rib 106, and peripheral rib 108) to define a plurality of holes (such as central hole 102 and peripheral hole 102'). Specifically, the peripheral rib 108 of the baseplate 10 is disposed at the outermost of the baseplate 10, and the peripheral rib 108 can be a frame-like rib or a plurality of ribs connected to each other in a head-to-tail manner to form a ring shaped configuration. As such, the baseplate 10 can have a frame structure, but not limited thereto. When a plurality of keyswitches are integrated into the keyboard, the baseplate 10 of each keyswitch can be connected by the peripheral rib 108, so as to form a single integral baseplate. The inner rib 104 is disposed at the center or in the neighborhood of the center of the baseplate 10 and configured to define the central hole 102, so the inner rib 104 encloses the central hole 102, and the central hole 102 substantially corresponds to the center or in the neighborhood of the center of the keycap 12. A plurality of the bridge ribs 106 is configured to connect the inner rib 104 and the peripheral rib 108. The bridge ribs 106 are disposed between the inner rib 104 and the peripheral rib 108 to define a plurality of peripheral holes 102', so the peripheral holes 102' substantially correspond to the peripheral portion or corners of the keycap 12. The central hole 102 and the peripheral holes 102' allow the light emitted from the light-emitting element 250 to pass therethrough, so as to illuminate the keycap 12 and thereout of from the light permeable portion 122.

Figure 3B:
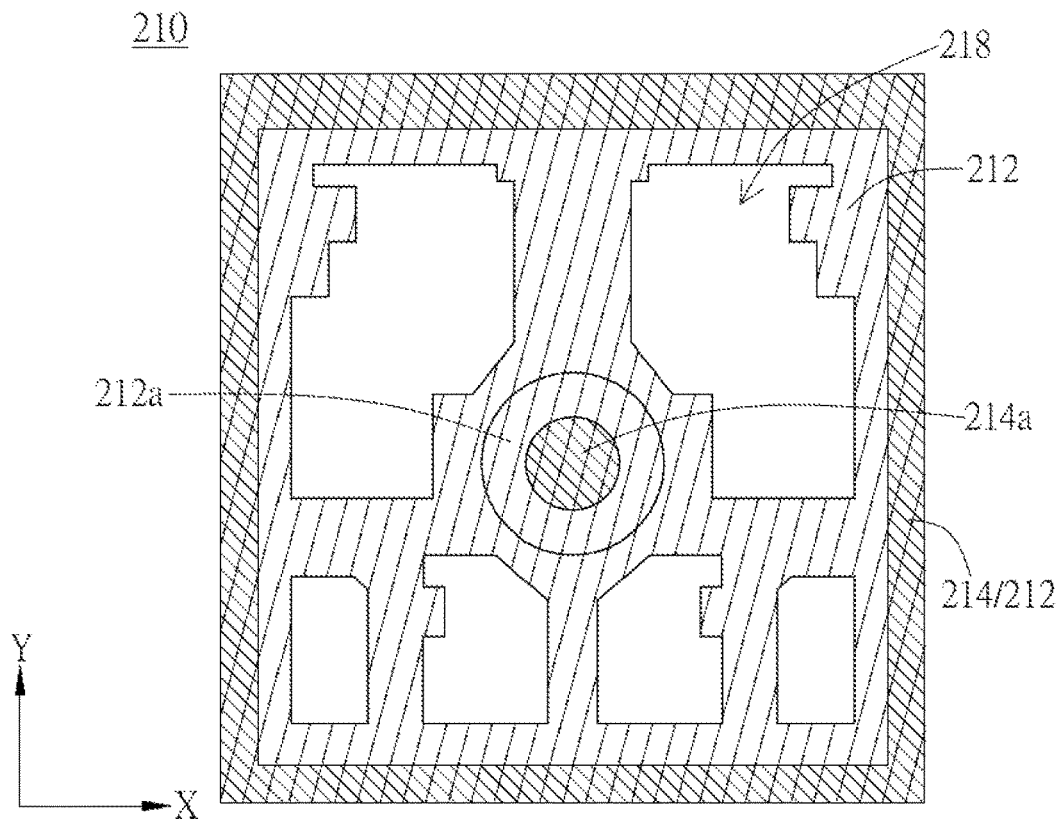

Specifically, as shown in FIG. 3 and FIG. 3B, the mask film 210 can be a light permeable film (such as polyethylene terephthalate (PET) film) with the first coating 212 and the second coating 214 formed by light-blocking materials thereon. In this embodiment, the first coating 212 and the second coating 214 have different light transmittances. As such, the first coating 212 can reflect a major portion of light and allow a small portion of light to pass therethrough (or absorb the small portion of light), and the second coating 214 can substantially block or absorb a major portion of light and allow a small portion of light to pass therethrough (or reflect the small portion of light). For example, in an embodiment, the first coating 212 can be a white ink coating, the second coating 214 can be a black ink coating, and both can be formed by the printing technology, but not limited thereto. Moreover, the second coating 214 is closer to the baseplate 10 than the first coating 212 is (i.e., the first coating 212 is closer to the light guide sheet 220 than the second coating 214 is). As such, a major portion of the upward light can be firstly reflected from the first coating 212, and a small portion of the upward light passing through the first coating 212 is then absorbed by the second coating 214, effectively directing the upward light from the vertical (upward) direction to propagate along the transverse (or horizontal) direction. In an embodiment, as shown in FIG. 2, the first coating 212 and the second coating 214 are preferably disposed on different surfaces of the mask film 210. For example, the first coating 212 is disposed on the lower surface of the mask film 210 (i.e., closer to the light guide sheet 220), and the second coating 214 is disposed on the upper surface of the mask film 210 (i.e., closer to the baseplate 10), but not limited thereto. In another embodiment (not shown), the first coating 212 and the second coating 214 can be disposed on the same surface of the mask film 210. For example, the first coating 212 is disposed on the upper surface of the mask film 210, and the second coating 214 is disposed on the upper surface of the mask film 210 and/or on the upper surface of the first coating 212. Alternatively, the second coating 214 can be disposed on the lower surface of the mask film 210, and the first coating 212 is disposed on the lower surface of the mask film 210 and/or on the lower surface of the second coating 214. As such, the upward light is mostly reflected from the first coating 212 and less passes through the first coating 212 to be absorbed by the second coating 214.

It is noted that in the figures (such as FIG. 3. FIG. 3B, FIG. 4, FIG. 5 or FIG. 7), the region with left-shaded lines is where the first coating 212 (or 212') is disposed, and the region with the right-shaded line is where the second coating 214 is disposed. When a region exhibits both of left-shaded lines and right-shaded lines, the region is where the first coating 212 (or 212') and the second coating 214 are overlappingly disposed, and the first coating 212 is closer to the light guide sheet 220 than the second coating 214 is.

Figure 4:
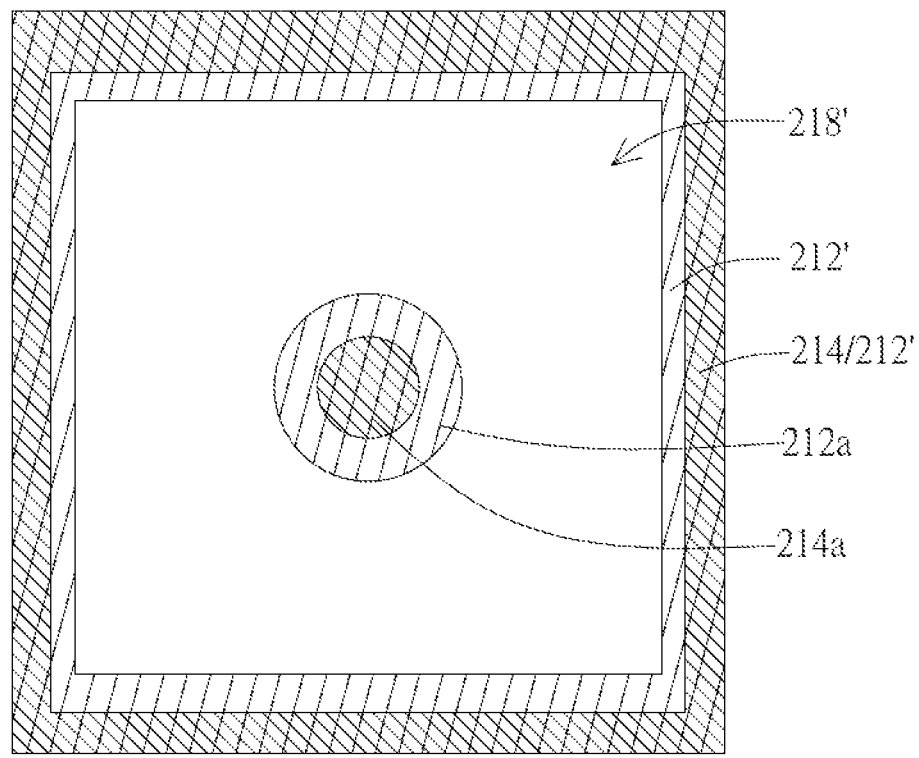
FIG. 4 is a schematic plan view of the mask film in another embodiment of the invention.

In an embodiment, the first coating 212 and the second coating 214 are disposed corresponding to the central hole 102, so the vertical projection of the first coating 212 on the baseplate 10 preferably overlaps the central hole 102 and extends to the inner rib 104. The vertical projection of the second coating 214 on the baseplate 10 is preferably located within the central hole 102. For example, the first coating 212 preferably has a first central coating portion 212a, and the second coating 214 preferably has a second central coating portion 214a. The first central coating portion 212a and the second central coating portion 214a preferably overlap with each other and correspond to the central hole 102 of the baseplate 10. As shown in FIG. 3 and FIG. 3B, taking the circled central hole 102 as an example, the diameter of the first central coating portion 212a is preferably larger than the diameter of the central hole 102, and the diameter of the central hole 102 is preferably larger than the diameter of the second central coating portion 214a. In practical applications, the first coating 212 (or the second coating 214) can have a distribution pattern corresponding to the arrangement of ribs of the baseplate 10. When the baseplate 10 and the mask film 210 are disposed in a stacked manner, the shape of the light permeable region 218 of the mask film 210 (i.e., the portion of the light permeable film without the first coating 212 and the second coating 214 disposed thereon) and the shape of the peripheral holes 102' of the baseplate 10 are preferably substantially identical. As shown in FIG. 3B, in addition to the second central coating portion 214a, which is located within the central hole 102, the second coating 214 can further have a coating portion partially corresponding to the peripheral ribs 108 of the baseplate 10. In addition to the first central coating portion 212a, which covers below the central hole 102, the first coating 212 can further have a coating portion overlapping (or corresponding to) the peripheral rib 108, the bridge ribs 106, and the inner rib 104 of the baseplate 10, so as to define the plurality of light permeable portions 218, which correspond to the peripheral holes 102' in number and shape, but not limited thereto. According to practical applications, the vertical projection of the first coating 212 (or the second coating 214) on the baseplate 10 preferably overlaps at least one of the bridge ribs 106, but not limited thereto. As shown in FIG. 4, in another embodiment, the arrangement of the second coating 214 of the mask film 210' is similar to that of FIG. 3B, i.e., the second coating 214 includes the second central coating portion 214a located within the central hole 102 and the coating portion corresponding to the peripheral rib 108. In the embodiment of FIG. 4, the first coating 212' includes the first central coating portion 212a and a coating portion corresponding to the peripheral rib 108, so the light permeable region 218' becomes a single continuous region, and the vertical projection of the light permeable region 218' on the baseplate 10 overlaps the bridge ribs 106 and the peripheral holes 102'. As shown in the figures, the coating portion of the first coating 212' corresponding to the peripheral rib 108 preferably extends beyond the coating portion of the second coating 214 corresponding to the peripheral rib 108 to be closer to the central hole 102 (i.e., the width thereof is wider), but not limited thereto. In another embodiment, the coating portion of the first coating 212' corresponding to the peripheral rib 108 can be the same as the coating portion of the second coating 214 corresponding to the peripheral rib 108 or retreats with respect to the central hole 102 (i.e., the width thereof is narrower).

Figure 3C:
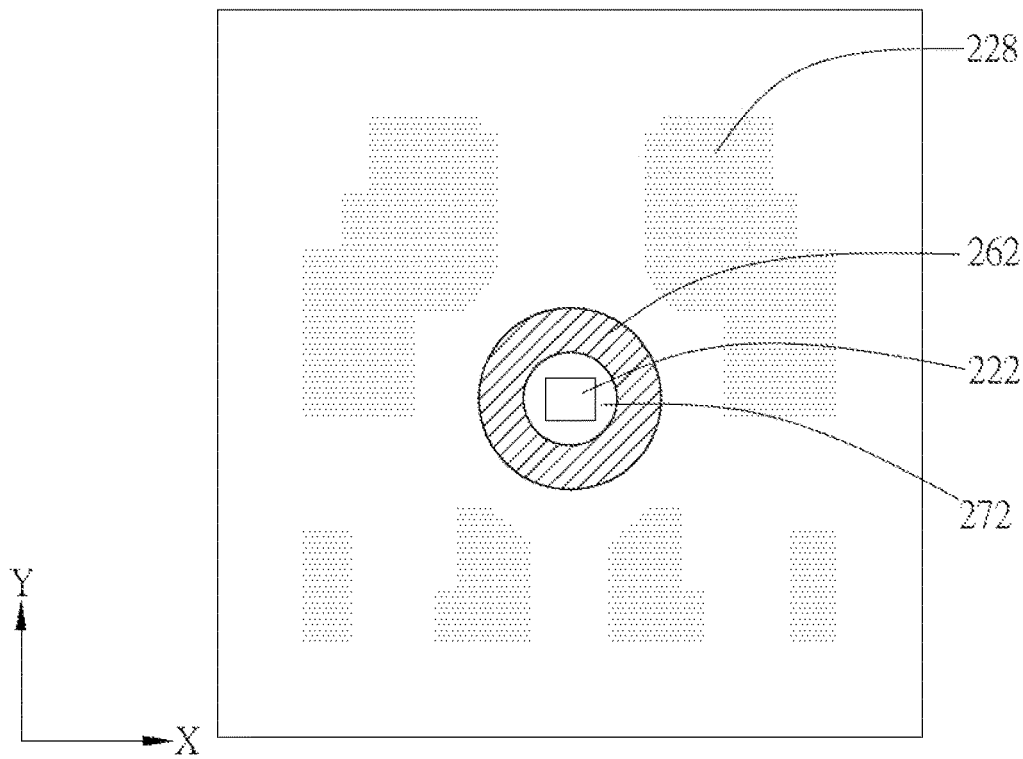

As shown in FIG. 3 and FIG. 3C, the light guide sheet 220 can be a film-like or sheet-like plate, which can be made of any suitable optical materials, such as optical polymers. The light source hole 222 is a through hole penetrating through the light guide sheet 220 in the thickness direction (i.e., Z-axis direction), so the light-emitting element 250 can be located in the light source hole 222. The first central coating portion 212a of the first coating 212 and the second central coating portion 214a of the second coating 214 are located right above the light source hole 222. The light guide sheet 220 can further have a plurality of light-exit portions 228 configured to destroy the total reflection of light to emit light upward. The plurality of light-exit portions 228 is preferably disposed corresponding to the peripheral holes 102', but not limited thereto. The light-exit portions 228 can be disposed at any positions for light output as appropriate. As shown in FIG. 3C, a top glue 262 is disposed on the top surface of the light guide sheet 220 and located around the light source hole 222. Specifically, the top glue 262 is configured to connect the mask film 210 and the light guide sheet 220 and located around the central hole 102, so the mask film 210, the light guide sheet 220, and the light-emitting element 250 can be positioned by the top glue 262 to enhance the optical coupling stability. Moreover, the top glue 262 can be formed by optical materials, which are light permeable and have a refractive index closer to that of the light guide sheet 220 than the air. As such, light reflected from the first central coating portion 212a can enter the light guide sheet 220 at a relatively higher proportion and then propagates in the light guide sheet 220 by total reflection. Moreover, the top glue 262 is spaced apart from the edge of the light source hole 222 of the light guide sheet 220 to form a top clearance region 272 therebetween, i.e., the region around the light source hole 222 without the top glue 262.

Figure 3D:
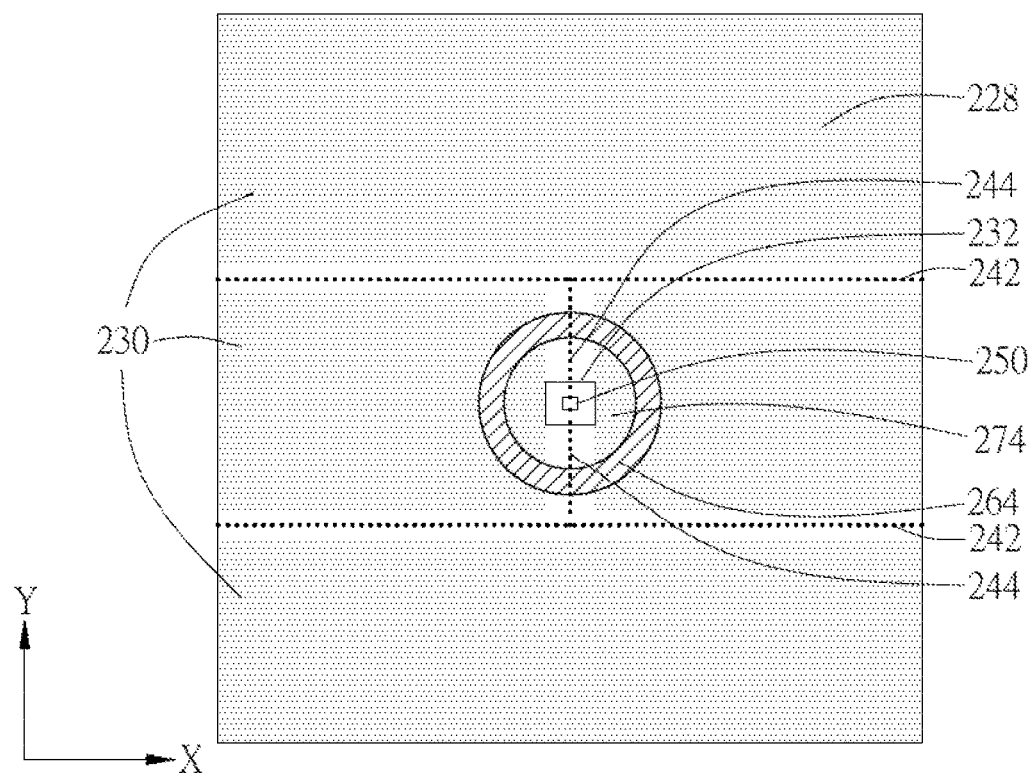

As shown in FIG. 3 and FIG. 3D, the reflective layer 230 is disposed at one side of the light guide sheet 220 opposite to the mask film 210 (e.g. the lower side) and configured to reflect light leaking from the bottom surface of the light guide sheet 220 back to the light guide sheet 220. Specifically, the reflective layer 230 can be a reflective film made of reflective materials (e.g. metal foil), a layer of reflective material coated on a non-reflective film, or a plastic film doped with reflective particles (e.g. PET film doped with reflective particles), but not limited thereto. In an embodiment, the reflective layer 230 can be a reflective coating (such as a white ink coating) coated on the upper surface of the driving circuit board 240, and the reflectivity of the reflective layer 230 is preferably larger than 80%, but not limited there. The opening 232 of the reflective layer 230 can be a through hole penetrating through the layer body of the reflective layer 230 or can be a portion of the upper surface of the driving circuit board 240 on which the light-emitting element 250 is disposed without the reflective coating. As shown in FIG. 3D, a bottom glue 264 is disposed on the top surface of the reflective layer 230 (or the bottom surface of the light guide sheet 220) and located around the light source hole 222. Specifically, the bottom glue 264 is configured to connect the light guide sheet 220 and the reflective layer 230 and located around the central hole 102, so the light guide sheet 220, the reflective layer 230, and the light-emitting element 250 can be positioned by the bottom glue 264 to enhance the optical coupling stability. Moreover, the bottom glue 264 can be formed by optical materials, which are light permeable and have a refractive index closer to that of the light guide sheet 220 than the air. As such, light reflected from the reflective layer 230 can enter the light guide sheet 220 at a relatively higher proportion and then propagates in the light guide sheet 220 by total reflection. Moreover, the top glue 262 and the bottom glue 264 can be formed by the same or different adhesive materials, such as water-based glues, but not limited thereto. The bottom glue 264 is spaced apart from the edge of light source hole 222 of the light guide sheet 220 (or the opening 232) to form a bottom clearance region 274 therebetween, i.e., the region around the light source hole 222 without the bottom glue 264. As shown in FIG. 3D, when the reflective layer 230 is the reflective coating formed on the upper surface of the driving circuit board 240, the opening 232 can be a portion of the upper surface of the driving circuit board 240 without the bottom glue 264 and without the reflective layer 230. The driving circuit board 240 further includes one or more main wirings 242 and one or more sub-wirings 244. For example, two main wirings 242 respectively provide high/low potentials, and two sub-wirings 244 respectively extend from the two main wirings 242, so the light-emitting element 250 is electrically connected to the main wirings 242 via the sub-wirings 244. Moreover, a light absorption layer (not shown) can be disposed under the reflective layer 230 and configured to absorb the light passing through the reflective layer 230.

Referring to FIG. 2 again, the layout design of the top glue 262 and the bottom glue 264 will be further described. As shown in FIG. 2, in a stacked direction of the baseplate 10, the mask film 210, the light guide sheet 220, and the reflective layer 230 (e.g. Z-axis direction), at least one of the top glue 262 and the bottom glue 264 overlaps the first coating 212. For example, only the top glue 262, only the bottom glue 264, or both of the top glue 262 and the bottom glue 264 overlaps the first coating 212 in the stacked direction. In an embodiment, as shown in the figure, the vertical projection of the top glue 262 or the bottom glue 264 on the mask film 210 can fall within the first coating 212. As described above, the top glue 262 or the bottom glue 264 is disposed surrounding the light source hole 222, so the top clearance region 272 is formed between the top glue 262 and the edge 2222 of the light source hole 222 of the light guide sheet 220, and the bottom clearance region 274 is formed between the bottom glue 264 and the edge 2222 of the light source hole 222 of the light guide sheet 220. In this embodiment, the top clearance region 272 is the top surface portion of the light guide sheet 220 around the light source hole 222 without the top glue 262, and the bottom clearance region 274 is the bottom surface portion of the light guide sheet 220 around the light source hole 222 without the bottom glue 264. From another aspect, the top clearance region 272 can be the lower surface portion of the mask film 210 around the light source hole 222 of the light guide sheet 220 without the top glue 262, and the bottom clearance region 274 can the upper surface portion of the reflective layer 230 (or the driving circuit board 240) without the bottom glue 264. As such, the top glue 262 or the bottom glue 264 can be prevented from entering the light source hole 222 to interfere with light output or from overlapping the adhesive layer 252 which fixes the light-emitting element 250 to unnecessarily increase the stacked height. In other words, with the arrangement of the top clearance region 272 and/or the bottom clearance region 274, at least one of the top glue 262 and the bottom glue 264 does not overlap the adhesive layer 252 (which fixes the light-emitting element 250) in the stacked direction (such as Z-axis direction), so as to effectively prevent the unnecessary increase of the stacked height. Preferably, the top glue 262 and the bottom glue 264 both do not overlap the adhesive layer 252 in the stacked direction.

In an embodiment, the bottom clearance region 274 is preferably larger than the top clearance region 272. For example, the distance between the bottom glue 264 and the edge 2222 of the light source hole 222 is larger than the distance between the top glue 262 and the edge 2222 of the light source hole 222 to prevent the bottom glue 264 and/or the reflective layer 230 from outputting light upward, so as to reduce the amount and chance of light outputting from the central region (e.g. the central hole 102), to increase the recycle of light from the central region, and increase the proportion of light traveling along the transverse (or horizontal) direction.

Moreover, since the first central coating portion 212a of the first coating 212, which overlaps the central hole 102 and extends to the inner rib 104, overlaps the top glue 262 and/or the bottom glue 264, so the top clearance region 272 and the bottom clearance region 274, which are adjacent to the light source hole 222, also overlap the first central coating portion 212a of the first coating 212 and even further overlaps the inner rib 104. In other words, at least one of the top glue 262 and the bottom glue 264 (preferably both of them) overlaps the first central coating portion 212a and the inner rib 104 in the stacked direction (such as Z-axis direction), so the top clearance region 272 and the bottom clearance region 274 also overlap the first central coating portion 212a. In an embodiment, the diameter of the coating portion of the first coating 212 covering right above the light source hole 222 (i.e., the first central coating portion 212a) is preferably larger than the diameter of the top glue 262. Specifically, as shown in FIG. 2A, the first central coating portion 212a preferably substantially extends under the whole inner rib 104, so the first central coating portion 212a has a larger reflective area to effectively direct the central light to the transverse (horizontal) direction, but not limited thereto.

As shown in FIG. 2, the light guide sheet 220 has a plurality of light-exit portions 228, which is configured to direct the light upward out of the light guide sheet 220. For example, the plurality of light-exit portions 228 is disposed on the bottom surface of the light guide sheet 220 and preferably corresponds to the peripheral holes 102'. The light-exit portion 228 can be any suitable optical microstructure, so when the light encounters the light-exit portion 228, the light will scatter upward out of the light guide sheet 220. Specifically, the vertical projection of the plurality of light-exit portions 228 on the baseplate 10 preferably does not overlap the inner rib 104 to form an exit-free region 226. In this embodiment, the exit-free region 226 preferably corresponds to the vertical projections of the inner rib 104 and the central hole 102 on the light guide sheet 220. From another aspect, the plurality of light-exit portions 228 is preferably not disposed in the top clearance region 272 and the bottom clearance region 274 to reduce the chance and amount of light outputting from the central hole 102, increase the recycle of light from the central region, and increase the proportion of light traveling along the transverse (horizontal) direction.

Figure 2A:
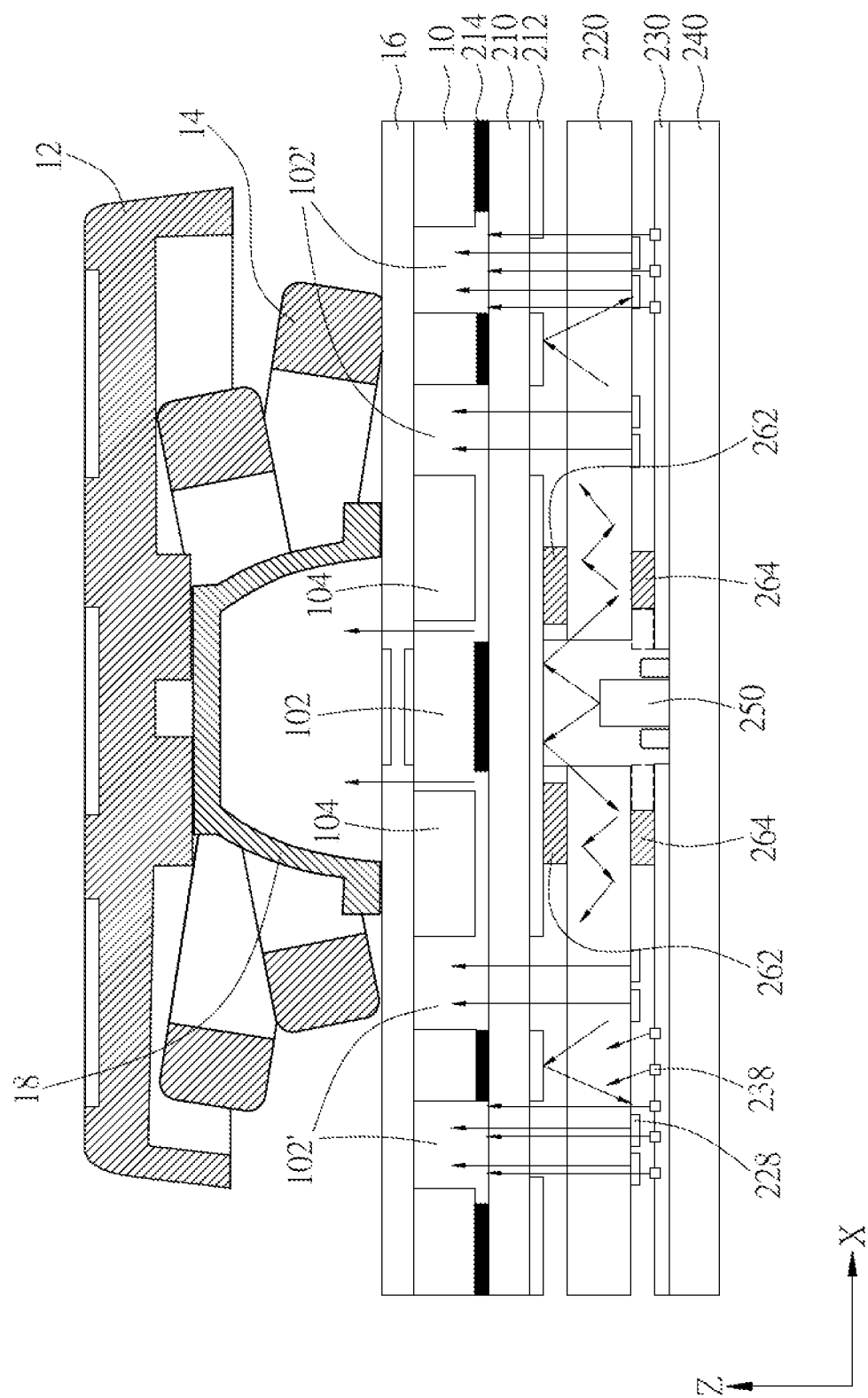
FIG. 2A is a schematic view showing the light propagation of the illuminated keyswitch structure in an embodiment of the invention.

Referring to FIG. 2 and FIG. 2A, the transverse propagation and recycle of the light of the illuminated keyswitch structure of the invention will be further described. As shown in FIG. 2 and FIG. 2A, since the first coating 212 is closer to the light guide sheet 220 than the second coating 214 is and covers right above the light source hole 222, when the light emitted from the light-emitting element 250 toward the central hole 102 encounters the first coating 212 (i.e., the first central coating portion 212a), most of the light will be reflected from the first coating 212 into the light guide sheet 220 due to the presence of the top clearance region 272. Since the light-exit portions 228 are not disposed in the exit-free region 226 of the light guide sheet 220 (e.g. the region corresponding to the central hole 102 and the inner rib 104), the light entering the light guide sheet 220 will be repeatedly reflected in the light guide sheet 220 along the transverse direction. Even when a portion of light is reflected to the top glue 262 (or the bottom glue 264) and emitted out of the light guide sheet 220, because the top glue 262 (or the bottom glue 264) overlaps the first coating 212 and the reflective layer 230 in the stacked direction, the light can be reflected back to the light guide sheet 220 to effectively achieve the light recycle and transverse propagation, not only reducing the amount of light output from the central hole 102 (i.e., preventing the central character of the keycap 12 from being too bright), but also promoting the light output from the peripheral portion of the keycap 12 (i.e., enhancing the luminance uniformity). Moreover, the size of the portion of the second coating 214 located in the central hole 102 (i.e., the second central coating portion 214a) can be modified based on the desired light output from the central hole 102 to at least partially block the light that passes through the first coating 212, so as to further modulate the luminance uniformity. In addition, since the light-exit portions 228 are disposed corresponding to the peripheral holes 102', and the first coating 212 can be further disposed corresponding to the bridge ribs 106, the light emitted from the light guide sheet 220 toward the bridge ribs 106 can be reflected from the first coating 212 back into the light guide sheet 220 and propagate to the light-exit portions 228 to be emitted out of the peripheral holes 102'. As such, the amount of light output from the peripheral holes 102' can be increased to enhance the luminance uniformity.

Moreover, as shown in FIG. 2A, the reflective layer 230 can be provided with microstructures 238, which are disposed further away from the light-emitting element 250 and configured to guide the light upward. When the microstructures 238 are disposed to overlap the light-exit portions 228 of the light guide sheet 220 in the stacked direction, the light output can be increased. When the microstructures 238 are disposed to overlap the non-light exit portion of the light guide sheet 220 in the stacked direction, such as overlapping the bridge rib 106 of the baseplate 10, the recycle of light can be facilitated.

Figure 5:
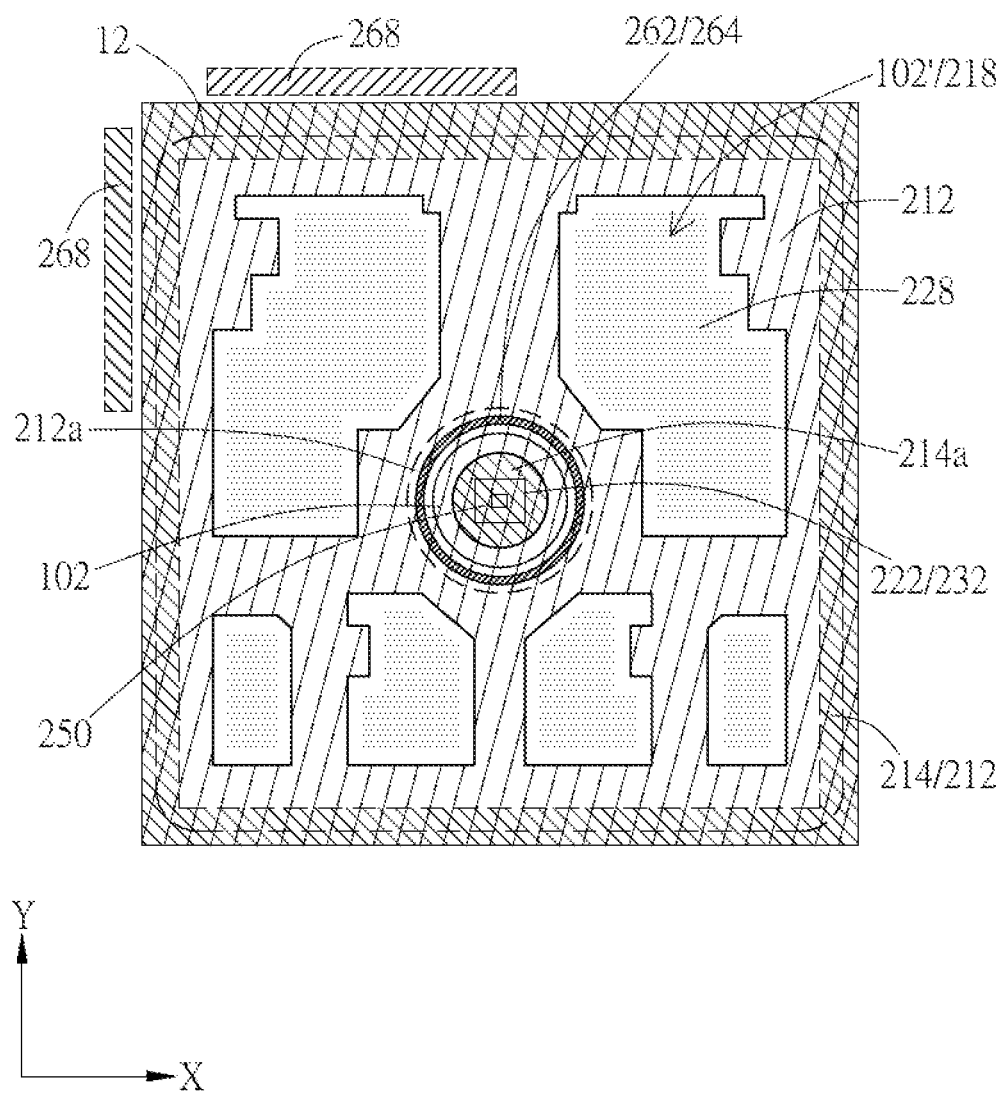
FIG. 5 is a schematic plan view of the stack of certain components of the illuminated keyswitch structure in another embodiment of the invention.

Referring to FIG. 5, FIG. 5 is a schematic plan view of the stack of certain components of the illuminated keyswitch structure in another embodiment of the invention. As shown in FIG. 5, the illuminated keyswitch structure (or the backlit module) further includes at least one side glue 268, and the side glue 268 is preferably disposed along the side of the keycap 12. The vertical projection of the plurality of light-exit portions on the mask film 210 is preferably located between the top glue 262 and the side glue 268 or between the bottom glue 264 and the side glue 268. Specifically, the light-exit portions are located between the light guide sheet 220 and the reflective layer 230. For example, the plurality of light-exit portions can be the light-exit portions 228 formed on the bottom surface of the light guide sheet 220 or the microstructures 230 formed on the upper surface of the reflective layer 230, and configured to guide the light upward. The side glue 268 can be disposed between the mask film 210 and the driving circuit board 240, between the mask film 210 and the light guide sheet 220, between the driving circuit board 240 and the light guide sheet 220, and/or between the mask film 210 and the reflective layer 230, and configured to enhance the adhesion between thereof. In this embodiment, the side glue 268 is preferably disposed parallel to the side of the keycap 12 and located outside of the vertical projection of the keycap 12, but not limited thereto.

Figure 6:
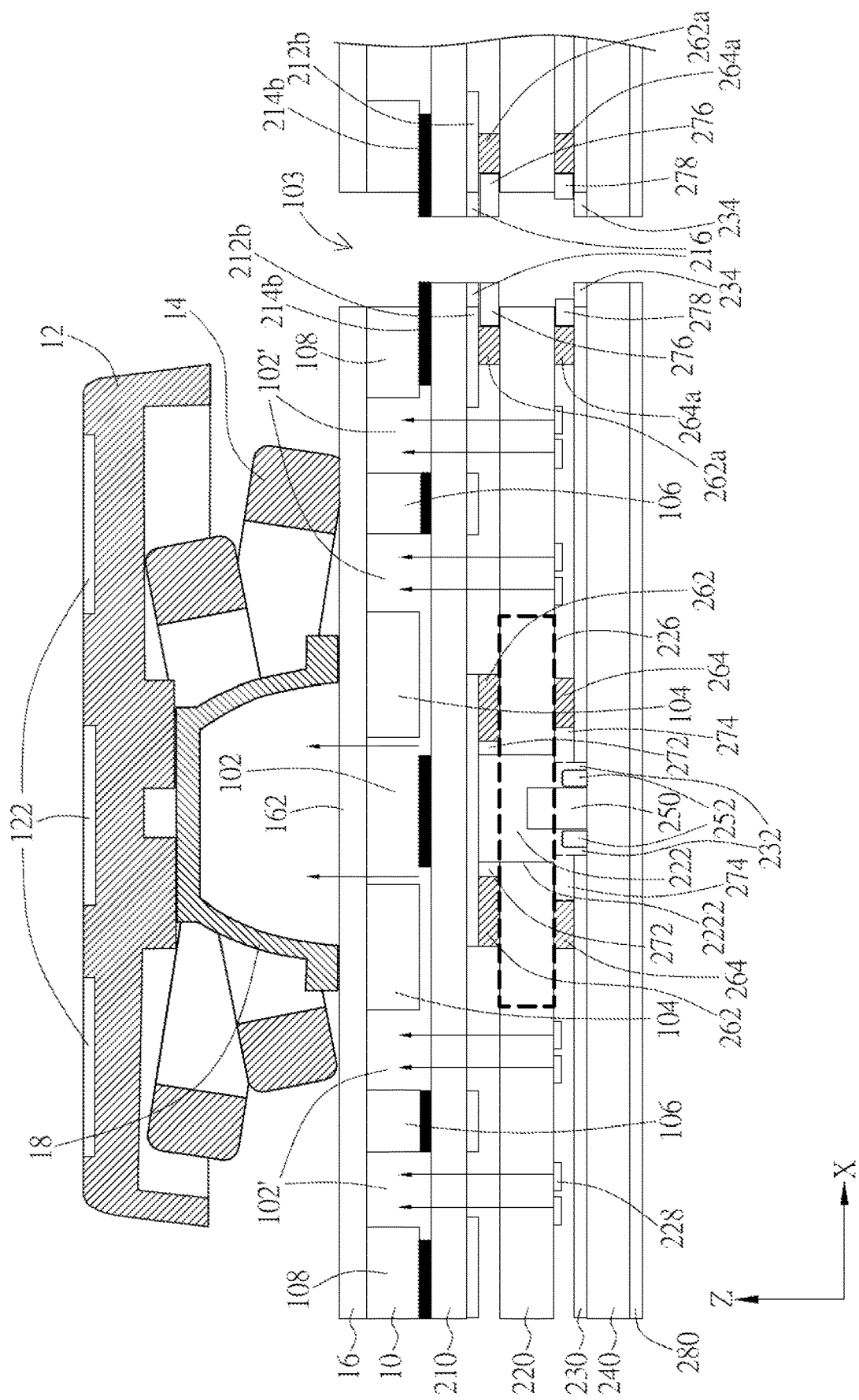
FIG. 6 is a schematic cross-sectional view of the illuminated keyswitch structure in another embodiment of the invention.
Figure 7:
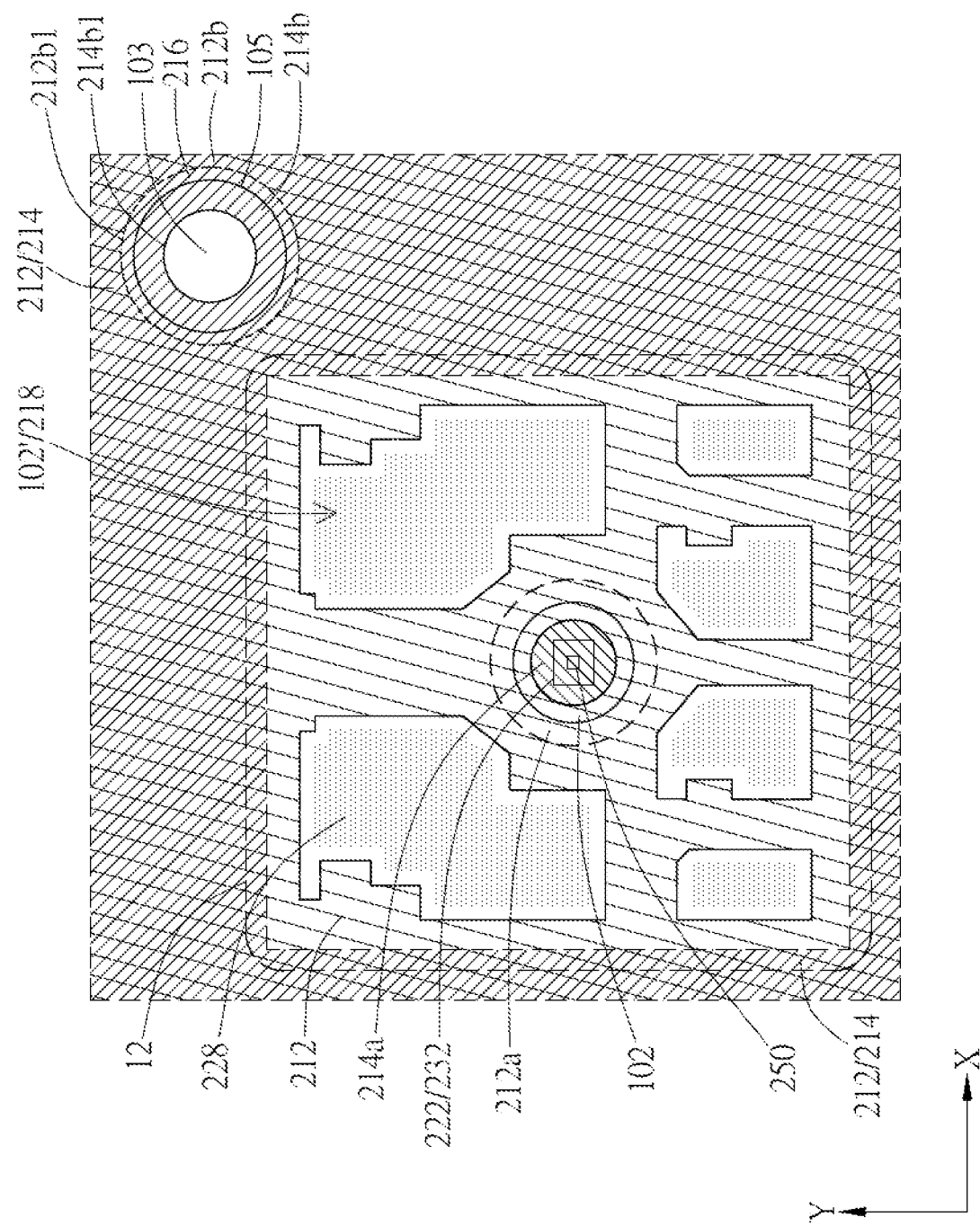
FIG. 7 is a schematic plan view of the stack of certain components of the illuminated keyswitch structure in another embodiment of the invention.

Referring to FIG. 6 and FIG. 7, FIG. 6 is a schematic cross-sectional view of the illuminated keyswitch structure in another embodiment of the invention, and FIG. 7 is a schematic plan view of the stack of certain components of the illuminated keyswitch structure in another embodiment of the invention. As shown in FIG. 6 and FIG. 7, the illuminated keyswitch structure further has a through hole 103. The through hole 103 penetrates through the baseplate 10, the mask film 210, the light guide sheet 220, the reflective layer 230, and the driving circuit board 240 and functions as a dissipation hole or a structural hole of the illuminated keyswitch structure. Corresponding to the disposition of the through hole 103, the illuminated keyswitch structure further includes a through-hole top glue 262a and a through-hole bottom glue 264a. The through-hole top glue 262a is disposed over the light guide sheet 220 around the through hole 103. The through-hole bottom glue 264a is disposed under the light guide sheet 220 around the through hole 103. For example, the through hole 103 is preferably disposed adjacent to the outer side of the keycap 12 or in the key gap between adjacent keyswitches. The first coating 212 (such as the first peripheral coating portion 212b) and the second coating 214 (such as the second peripheral coating portion 214b) are disposed surrounding the through hole 103. The first coating 212 preferably retreats from the through hole 103 with respect to the second coating 214 to form a modulation region 216.

Specifically, the first coating 212 can include the first central coating portion 212a and the first peripheral coating portion 212b, which can be simultaneously formed by the printing process on the lower surface of the mask film 210 at locations corresponding to the central hole 102 and the through hole 103, respectively. The second coating 214 can include the second central coating portion 214a and the second peripheral coating portion 214b, which can be formed simultaneously by the printing process on the upper surface of the mask film 210 at locations corresponding to the central hole 102 and the through hole 103, respectively, but not limited thereto. The second peripheral coating portion 214b preferably extends to the edge of the through hole 103. As shown in FIG. 7, the edge 214b1 of the second peripheral coating portion 214b is aligned with the edge of the through hole 103. The first peripheral coating portion 212b is spaced apart from the edge of the through hole 103 at the mask film 210 to form the modulation region 216. As shown in FIG. 7, the edge 212b1 of the first peripheral coating portion 212b and the edge of the through hole 103 (or the edge 214b1 of the second peripheral coating portion 214b) has a gap therebetween, and the first peripheral coating portion 212b further retreats with respect to the edge 105 of the through hole 103 at the baseplate 10. In other words, the first peripheral coating portion 212b does not extend to the edge of the through hole 103 (e.g. the edge 214b1) and does not extend to the edge 105 of the baseplate 10. That is, the first peripheral coating portion 212b is not disposed in the modulation region 216. Accordingly, the second peripheral coating portion 214b extends closer to the through hole 103 than the first peripheral coating portion 212b. In other words, the aperture of the second peripheral coating portion 214b is smaller than that of the first peripheral coating portion 212b. With such configurations, the modulation region 216 provided without the first peripheral coating portion 212b can reduce the chance of reflecting light into the through hole 103, and the second peripheral coating portion 214b can block the light emitting upward from the modulation region 216, so as to reduce the light leakage from the through hole 103. Moreover, the illuminated keyswitch structure can optionally include a third coating (not shown). The third coating is disposed in the modulation region 216 and configured to substantially block or absorb light. For example, the third coating can be disposed on the lower surface of the mask film 210 between the first peripheral coating portion 212b and the edge of the through hole 103. Specifically, according to practical applications, the modulation region 216 can be provided with the third coating having a lower transmittance to reduce the upward light that passes through the modulation region 216, further reducing the light leakage from the through hole 103. The transmittance of the third coating is preferably smaller than the transmittance of the first coating 212, and the third coating can be the same or different light-blocking materials as the second coating 214. For example, the third coating can be a black ink coating. Similarly, the reflective layer 230 can retreat with respect to the edge of the through hole 103, so a modulation region 234 can be formed between the reflective layer 230 and the edge of the through hole 103. The modulation region 234 can be provided with a fourth coating (not shown), which has a lower reflectivity (or higher absorptivity), to reduce the upward light reflected from the modulation region 234 and reduce the light that is inclinedly reflected forward, further reducing the light leakage of the through hole 103. The reflectivity of the fourth coating is preferably smaller than the reflectivity of the reflective layer 230, and the fourth coating can be the same or different light-blocking materials as the second coating 214. For example, the fourth coating can be a black ink coating on the upper surface of the driving circuit board 240 between the reflective layer 230 and the edge of the through hole 103. With such configurations, the modulation region 234 provided without the reflective layer 230 (or with the fourth coating) can reduce the chance of reflecting the light into the through hole 103, so as to reduce the light leakage from the through hole 103. In another embodiment, the fourth coating can be a light-absorbing cladding material (such as the cladding layer 280) on the backside (the lower side) of the driving circuit board 240 and exposed upward for absorbing light due to the modulation region 234 formed by retreating the reflective layer 230. Alternatively, the modulation region 234 is not necessarily formed by retreating the reflective layer 230, the fourth coating can be directly disposed on the reflective layer 230 around the through hole 103 to function as the modulation region 234 for absorbing light. In other words, no matter the fourth coating is disposed on the reflective layer 230 or on the driving circuit board 240, the light leakage from the through hole 103 can be effectively reduced. Moreover, if necessary, the edge portions of the mask film 210 and the driving circuit board 240 around the through hole 103 can be attached to each other in the through hole 103 by glue (not shown).

At least one of the through-hole top glue 262a and the through-hole bottom glue 264a overlaps the first coating 212 (i.e., the first peripheral coating portion 212b) in the stacked direction (such as Z-axis direction). The through-hole top glue 262a and the through-hole bottom glue 264a are preferably spaced apart from the edge of the through hole 103 at the light guide sheet 220 to form a top through-hole clearance region 276 and a bottom through-hole clearance region 278 therebetween, respectively. Specifically, the through-hole top glue 262a and the through-hole bottom glue 264a are disposed around the through hole 103 and configured to direct a certain proportion of light to the vertical direction (i.e., the stacked direction), reducing the amount of light leaking from the through hole 103. Moreover, the vertical projection of the first coating 212 (i.e., the first peripheral coating portion 212b) on the light guide sheet 220 preferably completely covers (overlaps) the through-hole top glue 262a (and the through-hole bottom glue 264a). The through-hole top glue 262a (and the through-hole bottom glue 264a) is preferably completely located within the vertical projections of the first coating 212 (i.e., the first peripheral coating portion 212b) and the second coating 214 (i.e., the second peripheral coating portion 214b). As such, the amount of light entering the through hole 103 via the through-hole top glue 262a (and the through-hole bottom glue 264a) can be effectively reduced, so as to reduce the light leakage from the through hole 103.

The top through-hole clearance region 276 and the bottom through-hole clearance region 278 are the top surface portion and the bottom surface portion of the light guide sheet 220 around the through hole 103, which are provided without the through-hole top glue 262a and the through-hole bottom glue 264a, respectively. The top through-hole clearance region 276 and the bottom through-hole clearance region 278 preferably correspond to each other in the stacked direction (such as Z-axis direction). As such, the through-hole top glue 262a or the through-hole bottom glue 264a can be prevented from entering the through hole 103 to interfere with heat dissipation or positioning and also reduce the amount of light entering the through hole 103 via the through-hole top glue 262a (the through-hole bottom glue 264a), so as to effectively reduce the light leakage from the through hole 103. In an embodiment, the top through-hole clearance region 276 and the bottom through-hole clearance region 278 can be optionally provided with a fifth coating (not shown), which has a lower reflectivity (or higher absorptivity), to reduce the light entering the through hole 103, further reducing the light leakage from the through hole 103. The fifth coating can be the same or different light-blocking materials as the second coating 214. For example, the fifth coating can be a black ink coating.

As shown in FIG. 6, in this embodiment, the illuminated keyswitch structure can further include the cladding layer 280. The cladding layer 280 is disposed under the driving circuit board 240 and extends to the projection of the through hole 103. The cladding layer 280 can extend flatly to at least cover under the through hole 103 and can be processed to further extend into the through hole 103. The cladding layer 280 preferably has a higher absorptivity to absorb the light in the through hole 103, so as to reduce the light leakage from the through hole 103. In an embodiment, the cladding layer 280 can extend into the through hole 103 and can be further attached or adhered to the second coating 214 (i.e., the second peripheral coating portion 214b). In an embodiment, the aperture of the second peripheral coating portion 214b (such as the length of the edge 214b1 in the X-axis direction) is preferably smaller than the aperture of the through hole 103 at the baseplate 10 (such as the length of the edge 105 in the X-axis direction), the aperture of the through hole 103 at the light guide sheet 220, and the aperture of the through hole 103 at the driving circuit board 240. Corresponding to the through hole 103, the aperture of the cladding layer 280 is preferably smaller than the aperture of the through hole 103 at the baseplate 10 (such as the length of the edge 105 in the X-axis direction), the aperture of the through hole 103 at the light guide sheet 220, the aperture of the through hole 103 at the driving circuit board 240, and the aperture of the through hole 103 at the reflective layer 230.

It is noted that when the illuminated keyswitch structure of the invention is applied to the keycap with characters mostly located at corners, only small amount of light (or even no light) directly emitted upward from the light-emitting element 250 is required, so the size of the central hole 102 of the baseplate 10 can be reduced, or the central hole 102 can even be omitted, but not limited thereto. In another embodiment, by increasing the size of the portion of the first coating 212 that covers right above the light-emitting element 250 (such as the first central coating portion 212a) or by forming the first coating 212 with metal materials, the reflectivity can be promoted, the amount of light propagating along the transverse direction can be increased, and the brightness at the peripheral portion (e.g. corners) of the keycap can be enhanced.

Figure 8A:
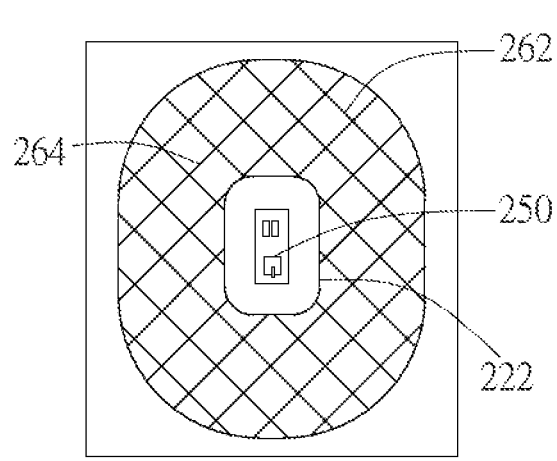
FIG. 8A to FIG. 8D are schematic plan views of the layout of glue layers in various embodiments of the invention.
Figure 8B:
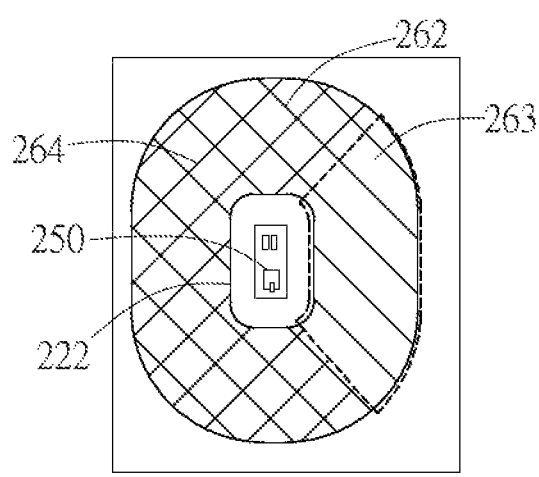
Figure 8C:
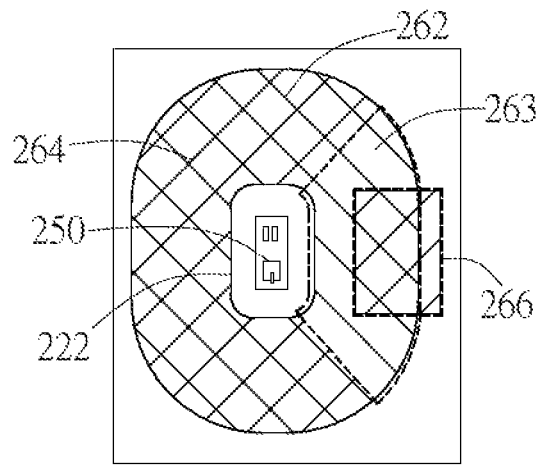
Figure 8D:
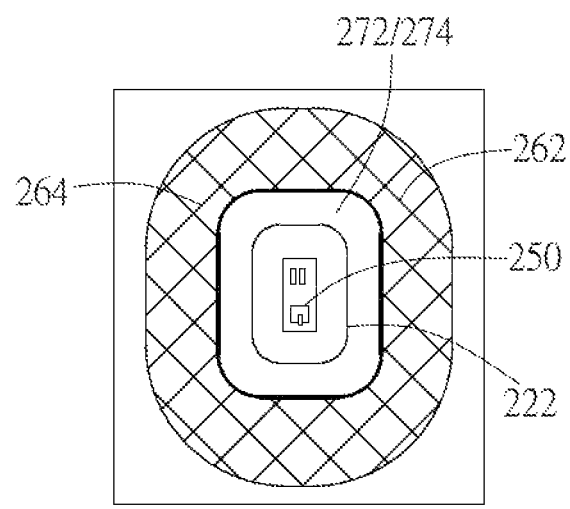

FIG. 8A to FIG. 8D are schematic plan views of the layout of glue layers in various embodiments of the invention, wherein the right hatched region represents the distribution region of the top glue 262, and the left hatched region represents the distribution region of the bottom glue 264. As shown in FIG. 8A, in a first embodiment, each of the top glue 262 and the bottom glue 264 surrounds the light source hole 222 to form a closed-ring coating region. As shown in FIG. 8B, in a second embodiment, the top glue 262 surrounds the light source hole 222 to form a closed-ring coating region, and the bottom glue 264 partially surrounds the light source hole 222 to form an open-ring coating region. For example, in the sector region 263, only the top glue 262 is disposed on the top surface of the light guide sheet 220, and the bottom glue 264 is not disposed on the bottom surface of the light guide sheet 220. As shown in FIG. 8O, in a third embodiment, the top glue 262 surrounds the light source hole 222 to form a closed-ring coating region, and the bottom glue 264 partially surrounds the light source hole 222 to form an open-ring coating region with an auxiliary coating region at the opening of the open-ring coating region. For example, in the sector region 263, only the top glue 262 is disposed on the top surface of the light guide sheet 220, and only an auxiliary portion of the bottom glue 264 is disposed on the bottom surface of the light guide sheet 220. For example, the bottom glue 264 is disposed on the bottom surface of the light guide sheet 220 in the enhancement region 266 as the auxiliary portion, and the enhancement region 266 partially overlaps the section region 263. As shown in FIG. 8D, in a fourth embodiment, each of the top glue 262 and the bottom glue 264 surrounds the light source hole 222 to form a closed-ring coating region. In this embodiment, the top glue 262 is spaced apart from the edge of the light source hole 222 to form the top clearance region 272 with no glue, and the bottom glue 264 is spaced apart from the edge of the light source hole 222 to form the bottom clearance region 274 with no glue.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. An illuminated keyswitch structure, comprising:
a baseplate having at least one bridge rib configured to define at least one peripheral hole;
a mask film disposed below the baseplate to allow partial light output;
a light guide sheet disposed on one side of the mask film opposite to the baseplate, the light guide sheet having a plurality of light-exit portions disposed corresponding to the at least one peripheral hole and at least one non-light-exit portion corresponding to the at least one bridge rib;
a reflective layer disposed on one side of the light guide sheet opposite to the mask film, the reflective layer provided with microstructures,
wherein in a stacked direction of the baseplate, the mask film, the light guide sheet, and the reflective layer, a first portion of the microstructures are disposed on the reflective layer to overlap the at least one non-light-exit portion of the light guide plate and overlap the at least one bridge rib of the baseplate.

2. The illuminated keyswitch structure of claim 1, wherein in the stacked direction, a second portion of the microstructures on the reflective layer are disposed to overlap the plurality of light-exit portions of the light guide plate and overlap the at least one peripheral hole of the baseplate.

3. The illuminated keyswitch structure of claim 1, wherein the mask film has a first coating configured to substantially reflect a light and a second coating configured to substantially block the light; the second coating is closer to the baseplate than the first coating is; on the baseplate, a vertical projection of the first coating overlaps the at least one bridge rib of the baseplate, and a vertical projection of the second coating overlaps the at least one bridge rib.

4. The illuminated keyswitch structure of claim 1, wherein the light guide sheet has a light source hole, and the illuminated keyswitch structure further comprises:
a top glue configured to connect the mask film and the light guide sheet and located around the light source hole; and
a bottom glue configured to connect the light guide sheet and the reflective layer and located around the light source hole.

5. The illuminated keyswitch structure of claim 4, wherein the microstructures on the reflective layer and the plurality of light-exit portions of the light guide sheet are disposed away from the light source hole.

6. The illuminated keyswitch structure of claim 4, wherein the top glue is spaced apart from an edge of the light source hole of the light guide sheet to form a top clearance region therebetween, and the bottom glue is spaced apart from the edge of the light source hole of the light guide sheet to form a bottom clearance region therebetween.

7. The illuminated keyswitch structure of claim 6, wherein the bottom clearance region is provided without the light-exit portions.

8. The illuminated keyswitch structure of claim 1, wherein the plurality of light-exit portions of the light guide sheet includes optical microstructures disposed on a surface of the light guide plate facing the reflective layer.

9. The illuminated keyswitch structure of claim 1, wherein the mask film includes at least one light permeable portion without any coating to allow light output; the first portion of the microstructures on the reflective layer does not overlap with the light permeable portion of the mask film in the stacked direction.

10. The illuminated keyswitch structure of claim 1, wherein the reflective layer is stacked next to the light guide sheet with at least a glue spaced therebetween.

11. The illuminated keyswitch structure of claim 1, further comprising a driving circuit covered underneath the reflective layer.

12. The illuminated keyswitch structure of claim 11, wherein the reflective layer has an opening to partially expose the driving circuit to electrically connect with a light-emitting element.

13. A backlit module adapted for a keyswitch, comprising:
a mask film allowing partial light output to the keyswitch;
a light guide sheet disposed on one side of the mask film, the light guide sheet having a light source hole and a plurality of light-exit portions, the plurality of light-exit portions disposed corresponding to the keyswitch;
a reflective layer disposed on one side of the light guide sheet opposite to the mask film; and
a light-emitting element accommodated in the light source hole of the light guide sheet;
wherein a through hole is defined close to the keyswitch and penetrates along a stacked direction through the mask film, the light guide sheet and the reflective layer, and the backlit module further comprises at least one of a through-hole top glue disposed above the light guide sheet and a through-hole bottom glue disposed under the light guide sheet;
wherein a peripheral coating portion exposed from at least one of the mask film and the reflective layer is defined surrounding the through hole to substantially block light, and in the stacked direction the peripheral coating portion overlaps with at least one of the through-hole top glue and the through-hole bottom glue.

14. The backlit module of claim 13, wherein the mask film has a first coating disposed close to the light guide sheet and a second coating configured away from light guide sheet, the first coating reflects light while the second coating substantially block light;
wherein the first coating and the second coating are disposed around the through hole, and the first coating is retreated from the through hole to partially expose the second coating from the mask film to form the peripheral coating portion.

15. The backlit module of claim 14, wherein at least one of the through-hole top glue and the through-hole bottom glue overlaps at least one of the first coating and the reflective layer in the stacked direction.

16. The backlit module of claim 13, further comprising a driving circuit board integrated with the reflective layer, wherein the backlit module further comprises a coating disposed on the driving circuit board surrounding the through hole to form the peripheral coating portion and substantially block the light.

17. The backlit module of claim 13, further comprising a cladding layer defined surrounding the through hole, wherein the cladding layer is at least partially exposed from behind the reflective layer to form the peripheral coating portion and substantially blocks light.

18. The backlit module of claim 13, wherein the through-hole top glue or the through-hole bottom glue is spaced apart from an edge of the through hole at the light guide sheet to form a top through-hole clearance region or a bottom through-hole clearance region therebetween.

19. The backlit module of claim 13, further comprising:
at least one of a top glue and a bottom glue surrounding the light source hole;
wherein the plurality of light-exit portions of the light guide sheet is located between the light source hole and the through hole, and the plurality of light-exit portions of the light guide sheet is located between the bottom glue and the through-hole bottom glue.

20. The backlit module of claim 13, further comprising:
at least one of a top glue and a bottom glue surrounding the light source hole; and
a side glue;
wherein the side glue is disposed along a side of the keyswitch; a vertical projection of the plurality of light-exit portions is located between the top glue and the side glue or located between the bottom glue and the side glue.

* * * * *